United States Patent
Duggan et al.

(10) Patent No.: US 7,102,245 B2
(45) Date of Patent: Sep. 5, 2006

(54) INTEGRAL GENERATOR/PINION ASSEMBLY FOR AXLE POWER GENERATION

(75) Inventors: James A. Duggan, Temperance, MI (US); Jun Yoshioka, Waterville, OH (US)

(73) Assignee: Torque-Traction Technologies LLC, Maumee, OH (US)

( * ) Notice: Subject to any disclaimer, the term of this patent is extended or adjusted under 35 U.S.C. 154(b) by 91 days.

(21) Appl. No.: 10/389,458

(22) Filed: Mar. 14, 2003

(65) Prior Publication Data

US 2003/0181281 A1 Sep. 25, 2003

Related U.S. Application Data

(60) Provisional application No. 60/366,191, filed on Mar. 21, 2002.

(51) Int. Cl.
F02B 63/04 (2006.01)
F03G 7/08 (2006.01)
H02K 7/18 (2006.01)

(52) U.S. Cl. ..................................... 290/1 R
(58) Field of Classification Search ............... 290/1 R, 290/40 R; 180/65.5; 310/75 R; 475/231
See application file for complete search history.

(56) References Cited

U.S. PATENT DOCUMENTS

| 827,766 | A | * | 8/1906 | Weiss | 290/15 |
| 3,317,765 | A | | 5/1967 | Cone | 310/74 |
| 3,604,966 | A | | 9/1971 | Liggett | 310/168 |
| 3,619,680 | A | | 11/1971 | Okamoto | 310/168 |
| 3,719,841 | A | | 3/1973 | Ritsema | 310/155 |
| 3,845,835 | A | * | 11/1974 | Petit | 180/65.3 |
| 4,377,975 | A | * | 3/1983 | Scott et al. | 105/96.1 |
| 4,504,761 | A | * | 3/1985 | Triplett | 310/339 |
| 4,677,365 | A | * | 6/1987 | Yang | 322/90 |
| 4,753,078 | A | * | 6/1988 | Gardner, Jr. | 60/668 |
| 4,912,995 | A | * | 4/1990 | Otters | 74/127 |
| 4,951,769 | A | * | 8/1990 | Kawamura | 180/65.4 |
| 5,120,282 | A | * | 6/1992 | Fjallstrom | 475/5 |
| 5,258,651 | A | * | 11/1993 | Sherman | 290/23 |
| 5,419,192 | A | * | 5/1995 | Maxwell et al. | 73/462 |
| 5,488,287 | A | * | 1/1996 | Kemner et al. | 322/20 |
| 5,527,225 | A | * | 6/1996 | Dick | 474/12 |
| 5,585,711 | A | * | 12/1996 | Kemner et al. | 322/46 |
| 5,680,908 | A | * | 10/1997 | Reed | 180/65.3 |
| 5,753,987 | A | * | 5/1998 | Shepherd et al. | 310/75 R |
| 5,762,161 | A | | 6/1998 | Caires et al. | 180/165 |

(Continued)

FOREIGN PATENT DOCUMENTS

CA 2316757 2/2001

(Continued)

Primary Examiner—Julio Gonzalez
(74) Attorney, Agent, or Firm—MacMillan, Sobanski & Todd, LLC

(57) ABSTRACT

A vehicular axle assembly includes an electrical generator for generating electricity to supply power to one or more electrical components therein during operation. The axle assembly includes a hollow housing that rotatably supports a differential mechanism therein. An input shaft is rotatably supported in the axle housing and terminates in a pinion gear. The pinion gear meshes with the differential mechanism that, in turn, rotatably drives a pair of output shafts that extend to respective driven wheels of the vehicle. A stator is supported within the axle housing about the input shaft, while a rotor is supported on the input shaft. When the input shaft is rotated, the rotor generates electrical power that may be used to operate the electrical component, such as a piezo-based device supported on a driveshaft assembly connected to the input shaft.

12 Claims, 2 Drawing Sheets

U.S. PATENT DOCUMENTS

| | | | | |
|---|---|---|---|---|
| 5,828,135 A | * | 10/1998 | Barrett | 290/3 |
| 5,971,088 A | | 10/1999 | Smith | 180/165 |
| 6,002,187 A | * | 12/1999 | Ohkura et al. | 310/67 A |
| 6,401,849 B1 | * | 6/2002 | Seguchi et al. | 180/65.6 |
| 6,520,678 B1 | * | 2/2003 | Aiken et al. | 384/1 |
| 6,793,034 B1 | * | 9/2004 | Raftari et al. | 180/285 |
| 2002/0139603 A1 | * | 10/2002 | Aiken et al. | 180/381 |
| 2004/0060749 A1 | * | 4/2004 | Roman | 180/65.1 |

FOREIGN PATENT DOCUMENTS

| | | |
|---|---|---|
| DE | 199 30 055 | 1/2001 |
| DE | 100 49 197 A1 | 4/2002 |
| DE | 10042617 A1 * | 3/2004 |
| EP | 0 806 315 | 11/1997 |
| GB | 650672 | 2/1951 |

* cited by examiner

INTEGRAL GENERATOR/PINION ASSEMBLY FOR AXLE POWER GENERATION

CROSS REFERENCE TO RELATED APPLICATION

This application claims the benefit of U.S. Provisional Application No. 60/366,191, filed Mar. 21, 2002, the disclosure of which is incorporated herein by reference.

BACKGROUND OF THE INVENTION

This invention relates in general to vehicular axle assemblies. In particular, this invention relates to an improved structure for a vehicular axle assembly that includes an electrical generator for generating electricity to supply power to one or more electrical components within or near the axle assembly during operation.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a hollow cylindrical driveshaft tube to an input shaft of an axle assembly so as to rotatably drive the wheels of the vehicle. To accomplish this, a first universal joint is usually connected between the output shaft of the engine/transmission assembly and a first end of the driveshaft tube, while a second universal joint is usually connected between a second end of the driveshaft tube and the input shaft of the axle assembly. The universal joints provide a rotational driving connection from the output shaft of the engine/transmission assembly through the driveshaft tube to the input shaft of the axle assembly, while accommodating a limited amount of misalignment between the rotational axes of these three shafts.

A typical axle assembly includes a number of rotatable components that transmit rotational power from the input shaft to the wheels thereof. These rotatable components are usually enclosed in protective non-rotatable housing. The housing typically includes a central carrier (which rotatably supports a differential mechanism therein) having a pair of outwardly extending tubes (which enclose the axle shafts extending from the differential mechanism to the wheels of the vehicle). In a manner that is well known in the art, rotation of the differential mechanism by the input shaft causes corresponding rotation of the output axle shafts. The differential mechanism distributes torque from the input drive shaft to the two output axle shafts, while permitting such output axle shafts to rotate at different speeds under certain conditions. As a result, torque is supplied to both wheels of the vehicle as it negotiates a turn, while permitting the outside wheel to turn faster than the inside wheel.

In some instances, it is desirable to provide an electrical component within or near the axle assembly. Such electrical components may, for example, be provided to sense one or more operating conditions of the vehicle drive train system. Unfortunately, the electrical power that is often necessary to operate such electrical components is not readily available at or near the location in which they are used. Thus, it would be desirable to provide an improved structure for a vehicular axle assembly that includes an electrical generator for generating electricity to supply power to one or more electrical components therein during operation.

SUMMARY OF THE INVENTION

This invention relates to an improved structure for a vehicular axle assembly that includes an electrical generator for generating electricity to supply power to one or more electrical components therein during operation. The axle assembly includes a hollow housing that rotatably supports a differential mechanism therein. An input shaft is rotatably supported in the axle housing and terminates in a pinion gear. The pinion gear meshes with the differential mechanism that, in turn, rotatably drives a pair of output shafts that extend to respective driven wheels of the vehicle. A stator of an electrical generator is supported within the axle housing about the input shaft, while a rotor of the electrical generator is supported on the input shaft. When the input shaft is rotated, the rotor of the electrical generator is rotated relative to the stator thereof. As a result, the electrical generators generates electrical power that may be used to operate the electrical component.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
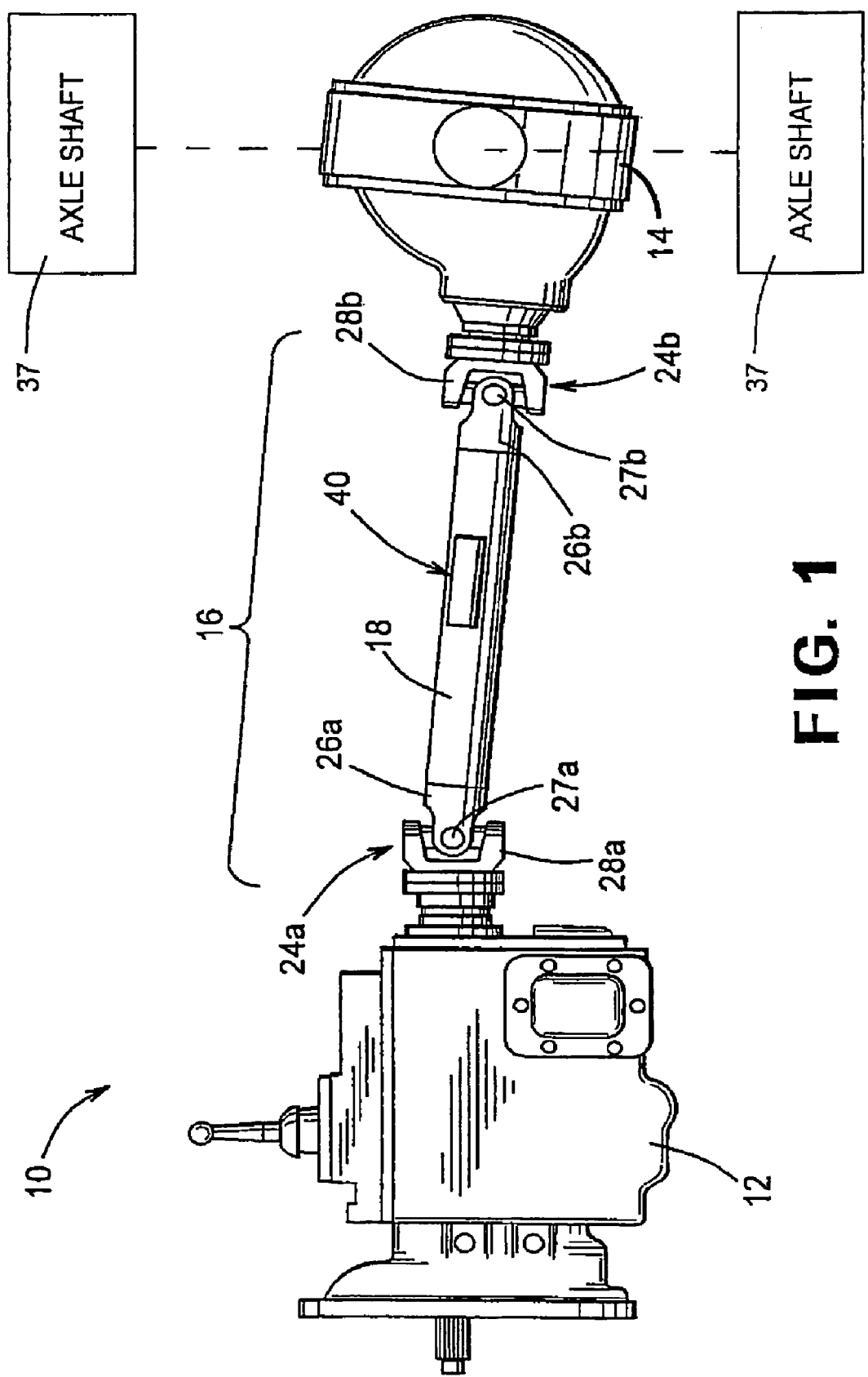
FIG. 1 is a side elevational view of a vehicular drive train system including an axle assembly in accordance with this invention.

Referring now to the drawings, there is illustrated in FIG. 1 a vehicle drive train system, indicated generally at 10, in accordance with this invention. The illustrated vehicle drive train system 10 is, in large measure, conventional in the art and is intended merely to illustrate one environment in which this invention may be used. Thus, the scope of this invention is not intended to be limited for use with the specific structure for the vehicle drive train system 10 illustrated in FIG. 1 or with vehicle drive train systems in general. On the contrary, as will become apparent below, this invention may be used in any desired environment for the purposes described below.

The illustrated vehicle drive train system 10 includes a transmission 12 having an output shaft (not shown) that is connected to an input shaft (see FIG. 2) of an axle assembly 14 through a driveshaft assembly 16. The transmission 12 is rotatably driven by an engine (not shown) that generates rotational power in a conventional manner. The driveshaft assembly 16 includes a cylindrical driveshaft tube 18 having a center portion and a pair of opposed end portions. The output shaft of the transmission 12 and the input shaft of the axle assembly 14 are typically not co-axially aligned. To accommodate this, a pair of universal joints, indicated generally at 24a and 24b, are provided at the end portions of the driveshaft tube 18 to respectively connect the end portions of the driveshaft tube 18 to the output shaft of the transmission 12 and to the input shaft of the axle assembly 14. The first universal joint 24a includes a tube yoke 26a that is secured to the forward end portion of the driveshaft tube 18 by any conventional means, such as by welding. The first universal joint 24a further includes a cross 27a that is connected to the tube yoke 26a in a conventional manner. Lastly, the first universal joint includes an end yoke 28a that is connected to the output shaft of the transmission 12 and to the cross 27a. Similarly, the second universal joint 24b includes a tube yoke 26b that is secured to the rearward end portion of the driveshaft tube 18 by any conventional means, such as by welding. The second universal joint 24b further includes a cross 27b that is connected to the tube yoke 26b in a conventional manner. Lastly, the second universal joint 24b includes an end yoke 28b that is connected to the cross 27b and to the input shaft of the axle assembly 14. The drive train assembly 10 thus far described is conventional in the art and is intended to be representative of any known structure for transmitting rotational power from a source to a driven device.

Figure 2:
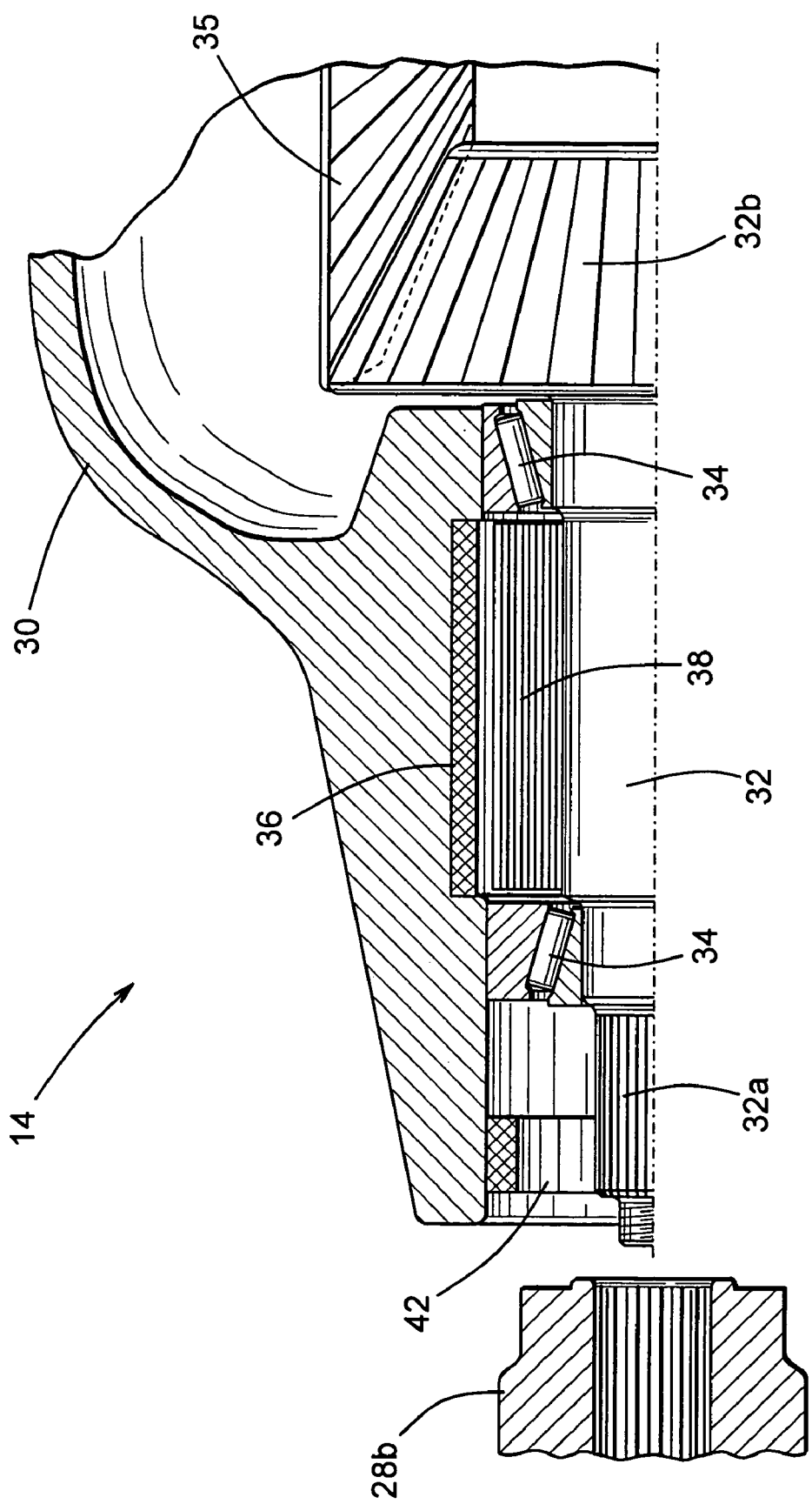
FIG. 2 is an enlarged exploded sectional elevational view of a portion of the axle assembly illustrated in FIG. 1.

FIG. 2 illustrates a portion of the axle assembly 14 in detail. As shown therein, the axle assembly 14 includes a hollow housing 30 having an input shaft 32 rotatably supported therein by a pair of tapered roller bearing assemblies 34. The input shaft 32 includes a first externally splined end 32a that is adapted to cooperate with an internally splined portion of the end yoke 28b. Thus, rotation of the end yoke 28d causes rotation of the input shaft 32. The input shaft 32 also includes a second end having a pinion gear 32b formed integrally therewith or otherwise secured thereto. Thus, rotation of the input shaft 32 also causes rotation of the pinion gear 32b. In a manner that is well known in the art, the pinion gear 32b is adapted to cooperate with a ring gear 35 or other portion of a conventional differential mechanism that is rotatably supported in the axle housing 30. Rotation of the differential mechanism by the input shaft 32 causes corresponding rotation of a pair of output axle shafts (shown at 37 in FIG. 1) that extend laterally from the differential mechanism to the wheels of the vehicle. The differential mechanism distributes torque from the input shaft 32 to the two output axle shafts, while permitting such output axle shafts to rotate at different speeds under certain conditions. As a result, torque is supplied to both wheels of the vehicle as it negotiates a turn, while permitting the outside wheel to turn faster than the inside wheel.

In accordance with this invention, an electrical generator is provided within the axle housing 30. The electrical generator includes a stator 36 that is supported on the axle housing 30 and a rotor 38 that is mounted on the input shaft 32. Thus, the rotor 38 rotates with the input shaft 32 relative to the stationary stator 36 and the axle housing 30 during operation of the vehicle. It will be appreciated, however, that the stator 36 can be supported on the input shaft 32 and the rotor 38 can be supported on the axle housing 30 if desired.

The stator 36 and the rotor 38 of the electrical generator can be formed from any desired components that generate electrical power when rotated or otherwise moved relative to one another. For example, the stator 36 of the electrical generator can include a plurality of permanent magnets that are supported in an annular array within the axle housing 30 about the input shaft 32. The rotor 38 can include a plurality of windings of an electrical conductor that are supported on the input shaft 32. When the windings of the rotor 38 are rotated past the permanent magnets of the stator 36, electrical currents are induced in the windings. In a manner that is well known in the art, such induced electrical currents can be used to supply electrical power through one or more wires (not shown) to one or more electrical components during operation of the vehicle.

In the illustrated embodiment, the rotor 38 rotates whenever the input shaft 32 is rotated by the driveshaft assembly 16. Thus, the wires that extend from the windings of the rotor 38 also rotate therewith. Such an arrangement is advantageous if the electrical component that is being supplied with the electrical energy also rotates with the driveshaft assembly 16 and the input shaft 32. This is because the electrical energy can be supplied directly from the rotor 38 to the electrical component with a minimum length of wiring and without the need for slip rings or other commutation devices.

For example, the electrical component may be a piezo-based device, such as indicated generally at 40 in FIG. 1, that is attached or otherwise mounted on the driveshaft tube 18. Such a piezo-based device 40 can be used as an active vibration dampening mechanism, wherein the application of an electrical current (such as from the electrical generator discussed above) to the piezo-based device 40 causes changes in the stiffness or flexibility thereof. When one or more piezo-based devices 40 are attached to the either inner or outer surface of the driveshaft tube 18, or alternatively embedded within or formed integrally with the driveshaft tube 18, torsional and lateral vibrations in the driveshaft tube 18 and the vehicle drive train assembly 10 as a whole can be actively controlled. The wires that provide the electrical energy to the piezo-based device 40 can be formed integrally with the end yoke 28b or may extend through an opening (not shown) formed therethrough. Alternatively, such wires may extend through a space provided in the internally splined portion of the end yoke 28b.

If desired, a signal generator 42 can also be provided within the axle housing 30. The signal generator 42 can, for example, be a Hall effect sensor that is responsive to the rotation of the splined end 32a of the input shaft 32 for generating an electrical signal that is representative of the movement of each of the splines therepast during operation of the vehicle. The signals from the signal generator 42 can be used, for example, to generate a signal that is representative of the rotational speed of the input shaft 32 relative to the axle housing 30 for use in computing and correcting imbalances in the driveshaft assembly 16.

In accordance with the provisions of the patent statutes, the principle and mode of operation of the present invention have been explained and illustrated in its preferred embodiment. However, it must be understood that the present invention may be practiced otherwise than as specifically explained and illustrated without departing from its spirit or scope.

What is claimed is:

1. An axle assembly comprising:
    a housing;
    a differential mechanism that is rotatably supported within said housing, said differential mechanism including a rotatable input shaft that rotatably drives a pair of rotatable output shafts while permitting said output shafts to rotate at different speeds under certain conditions; and
    an electrical generator including a fast portion that is supported on said housing and a second portion that is supported on said input shaft of said differential, said electrical generator being responsive to rotation of said input shaft relative to said housing for generating electrical power.

2. The axle assembly defined in claim 1 wherein said electrical generator includes a stator that is supported within said axle housing and a rotor that is supported on said input shaft.

3. The axle assembly defined in claim 1 further including an electrical component that receives the electrical power generated by said electrical generator.

4. The axle assembly defined in claim 3 wherein said electrical component is a piezo-based device that is attached to an either inner surface or an outer surface of a driveshaft tube connected to said input shaft, or is embedded within said driveshaft tube.

5. A drive train system comprising:

a source of rotational power;

a driveshaft assembly connected to said source of rotational power; and an axle assembly including a housing, a differential mechanism that is rotatably supported within said housing and includes an input shaft that is connected to said driveshaft assembly and that rotatably drives a pair of rotatable output shafts while permitting said output shafts to rotate at different speeds under certain conditions, and an electrical generator including a first portion that is supported on said housing and a second portion that is supported on said input shaft of said differential, said electrical generator being responsive to rotation of said input shaft relative to said housing for generating electrical power.

6. The axle assembly defined in claim 5 wherein said electrical generator includes a stator that is supported within said axle housing and a rotor that is supported on said input shaft.

7. The axle assembly defined in claim 5 further including an electrical component that receives the electrical power generated by said electrical generator.

8. The axle assembly defined in claim 7 wherein said electrical component is a piezo-based device that is attached to an either inner surface or an outer surface of a driveshaft tube connected to said input shaft, or is embedded within said driveshaft tube.

9. An axle assembly comprising:

a housing;

a differential mechanism that is rotatably supported within said housing, said differential mechanism including a rotatable input shaft that rotatably drives a pair of rotatable output shafts while permitting said output shafts to rotate at different speeds under certain conditions; and an electrical generator including a stator supported on one of said housing and said input shaft and a rotor supported on the other of said housing and said input shaft, said electrical generator being responsive to rotation of said input shaft relative to said housing for generating electrical power.

10. The axle assembly defined in claim 9 wherein said stator is supported on said axle housing and said rotor is supported on said input shaft.

11. The axle assembly defined in claim 9 further including an electrical component that receives the electrical power generated by said electrical generator.

12. The axle assembly defined in claim 11 wherein said electrical component is a piezo-based device that is attached to an either inner surface or an outer surface of a driveshaft tube connected to said input shaft, or is embedded within said driveshaft tube.

* * * * *